United States Patent [19]
Nakayama et al.

[11] Patent Number: 4,983,020

[45] Date of Patent: Jan. 8, 1991

[54] DYEING RESISTANT INSULATION FILM OF HIGH QUALITY FOR A COLOR FILTER FOR USE IN A SOLID-STATE IMAGE PICKUP ELEMENT

[75] Inventors: Toshimasa Nakayama, Hiratsuka; Hidekatsu Kohara, Chigasaki; Naoki Aoyanagi, Samukawa; Daisuke Hayashi, Tokyo, all of Japan

[73] Assignee: Tokyo Ohka Kogyo Co., Ltd., Japan

[21] Appl. No.: 338,523

[22] Filed: Apr. 14, 1989

Related U.S. Application Data

[63] Continuation of Ser. No. 200,119, May 27, 1988, abandoned.

[30] Foreign Application Priority Data

May 28, 1987 [JP] Japan .................................. 62-129821

[51] Int. Cl.$^5$ ................................................ G02B 5/22
[52] U.S. Cl. ..................................... 350/317; 350/311
[58] Field of Search ................................. 350/317, 311

[56] References Cited

U.S. PATENT DOCUMENTS 2,868,760  1/1959  Staicopoulis ........................ 526/273
3,096,313  7/1963  Benjamins et al. ................. 526/273
3,817,946  6/1974  Ree .
3,847,863 11/1974  Labana et al. ...................... 526/273

FOREIGN PATENT DOCUMENTS 61-180235  8/1986  Japan .
966621  8/1964  United Kingdom .
1099783  1/1968  United Kingdom .
1287714  9/1972  United Kingdom .
1415013 11/1975  United Kingdom .
1566647  5/1980  United Kingdom .

*Primary Examiner*—Joseph L. Schofer
*Assistant Examiner*—Alex H. Walker
*Attorney, Agent, or Firm*—Lowe, Price, LeBlanc, Becker & Shur

[57] ABSTRACT

A dyeing resistant insulation film for forming a color filter which exhibits no scattering between the dyed layer and the light detection portion and having high bondability with the dyed layer can be provided by utilizing a copolymer of glycidyl methacrylate and methyl methacrylate. A color filter of extremely high quality can be prepared by using this dyeing resistant insulation film for forming the color filter.

9 Claims, 1 Drawing Sheet

DYEING RESISTANT INSULATION FILM OF HIGH QUALITY FOR A COLOR FILTER FOR USE IN A SOLID-STATE IMAGE PICKUP ELEMENT

This application is a continuation of application Ser. No. 07/200,119, filed May 27, 1988, now abandoned.

FIELD OF THE INVENTION

The present invention concerns a dyeing resistant insulation film for forming a color filter and, more specifically, it relates to a dyeing resistant insulation film utilized as a dyeing resistant layer of an organic color filter formed on a light detection portion of a solid-state image pickup element

DESCRIPTION OF PRIOR ART

Research and development for solid-state image pickup elements have made remarkable progress in recent years. In known solid-state image pickup elements, color filters accurately matching the light detection portions can be applied, different from the case of a tubular bulb. Since signals of light (light intensity of darkness and brightness) are accumulated as the amount of electric charges and taken out as electric signals in known solid-state image pickup elements, it is not possible to distinguish information regarding colors. A color filter is disposed on the light detection portion of a solid-state image pickup element for distinguishing colors. The color filter usually comprises dyed layers of three colors laminated on a light detection portion and so adapted that the light detection portion can distinguish color by exposing respective dyed color layers corresponding to three colors of light, that is, red, green and blue. The solid-state image pickup element has a feature that about the same extent of resolution power can be obtained for a chromatic element as that for a monochromatic element by the skillful arrangement of the color filter.

Basic characteristics required for a solid-state image pickup element are sensitivity and resolution power and various proposals have been made for the system of the solid-state image pickup element in order to improve such fundamental characteristics. In view of the ease for the noise reduction, an image pickup element using a charge coupled device (hereinafter simply referred to as a CCD image pickup element) has generally been used. Since the CCD image pickup element is a completely analog element, if there is scattering, even little, for the characteristics between a plurality of light detection portions, it reflects as the distortion of images. Accordingly, it has been demanded to provide an extreme uniformity in view of the fabrication technique and the material quality for producing the image pickup element as a picture element with no scattering at a good yield.

By the way, a color filter used for the CCD image pickup element is usually prepared by directly forming a color filter layer on a light detection portion of the CCD image pickup element. Specifically, it is prepared by forming a polymer layer on the light detection portion of the CCD image pickup element for the flattening purpose and then repeating the process of disposing thereover a patterned and dyed layer, forming a transparent dyeing resistant insulation layer and then forming the next dyed layer thereover in the same manner.

In this case, selection of the dyeing resistant insulation layer constitutes an important factor for preparing a high quality color filter. Particularly, it has an important role of preventing color bleeding in the dyed layer or preventing scattering between the dyed layer and a light detection portion. Further, it is required for the dyeing resistant insulation layer that it has satisfactory dyeing resistance, bondability with the flattening layer and the dyed layer, transparency, chemical resistance and film coating properties, and films of various organic glass material, for example, polymethyl methacrylate have been used so far.

In addition, as the organic glass film forming the dyeing resistant insulation layer, there has been known a polymer prepared by radical copolymerization of glycidyl ester of acrylic acid or glycidyl ester of methacrylic acid with a reaction product of 2-hydroxyethyl acrylate or 2-hydroxyethyl methacrylate and cinnamoyl chloride or a derivative thereof by using a radical polymerization initiator such as azobis isobutyronitrile or benzoyl peroxide (Japanese Patent Unexamined Patent Publication No. Sho 61-180235).

However, they can not satisfy all of the required properties described above as the dyeing resistant insulation layer. The dyeing resistant insulation layer obtained from the polymer described in the Japanese Patent Unexamined Publication No. Sho 61-180235 tends to cause scattering between the dyed layer and the light detection portion, while polymethyl methacrylate is poor regarding the bondability with the dyed layer. Accordingly, neither of these polymers are practical as the dyeing resistant insulation film.

OBJECT OF THE INVENTION

The present inventors have made an earnest study with an aim of providing a composition for forming a dyeing resistant insulation film capable of overcoming the drawbacks in conventional organic glass films used as the dyeing resistant insulation layer for forming a color filter and, as a result, have found that the foregoing object can be attained by a copolymer of glycidyl methacrylate and methyl methacrylate.

SUMMARY OF THE INVENTION

The object of the present invention can be attained by using a copolymer of glycidyl methacrylate and methyl methacrylate as a dyeing resistant insulation film for forming a color filter.

Since a dyeing resistant insulation film for forming a color filter capable of accurately matching the dyed layer with the light detection portion and having a high bondability with the dyed layer can be provided according to the present invention, a color filter of extremely high quality can be prepared by using the dyeing resistant insulation film for forming the color filter.

DETAILED DESCRIPTION OF THE PREFERRED EMBODIMENT

(Copolymer)

The dyeing resistant insulation film capable of preventing scattering between the dyed layer and the light detection portion and improving the bondability with the dyed layer intended in the present invention is constituted with a copolymer of glycidyl methacrylate (hereinafter simply referred to as GMA) and methyl methacrylate (hereinafter simply referred to as MMA).

The copolymer is prepared in accordance with known method for the radical copolymerization of GMA and MMA. The blending ratio between GMA and MMA for the copolymerization is within a range from 2:8 to 8:2, preferably, from 3:7 to 5:5 by weight ratio. If the range is exceeded, images with color shading are formed since no accurate matching can be obtained between the light detection portion and the dyed layer. Since the solid-state image pickup element that forms such images is not excellent in the resolution power, it is not preferred.

Of the copolymer thus obtained, those having a molecular weight from 50,000 to 550,000 can be used and, particularly, those within a range from 150,000 to 400,000 are preferred for preparing the coating solution for forming the dyeing resistant insulation film practically.

Further, those copolymers having dispersity (which is an indication of the distribution of the molecular weight) within a range from 1.05 to 3.50 can be used preferably.

If the molecular weight and the dispersity are within the respective ranges described above, a dyeing resistant insulation film which does not degrade the matching property between the dyed layer and the light detection portion can be obtained.

(Coating Solution)

The dyeing resistant insulation film according to the present invention is preferably prepared by usually applying a coating solution comprising the copolymer as described above dissolved in an organic solvent. The organic solvent used for this purpose can include, for example, the following:

(1) Ketones such as acetone, methyl ethyl ketone, cyclohexanone and isoamyl ketone;

(2) Polyhydric alcohols and derivatives thereof such as ethylene glycol, ethylene glycol monoacetate, diethylene glycol, monomethyl ether of diethylene glycol monoacetate, monoethyl ether of diethylene glycol monoacetate, monopropyl ether of diethylene glycol monoacetate, monobutyl ether of diethylene glycol monoacetate; or monophenyl ether of diethylene glycol monoacetate.

(3) Glycol derivatives such as methyl ether of propylene glycol, ethyl ether of propylene glycol or butyl ether of propylene glycol, methyl ether acetate of propylene glycol, ethylether acetate of propylene glycol or butylether acetate of propylene plycol.

These solvents may be used alone or as a mixture of two or more of them.

Figure 1A:
FIG. 1 is an explanatory view for the method of using the dyeing resistant insulation film for forming a color filter according to the present invention.

In the drawing, are shown a silicon wafer 1, a light detection portion 2, a protection film 3, a flattening layer 4, a layer 5 made of photosensitive material and dyed in the course of the production step, a dyed and patterned layer 5', a patterning mask 6, a dyeing resistant insulation layer 7, a second patterned and dyed layer 8, and a second dyeing resistant insulation layer 9.

(Method of Using the Coating Solution)

The coating solution for forming the dyeing resistant insulation film thus prepared is used as described below.

First Step

Figure 1B:
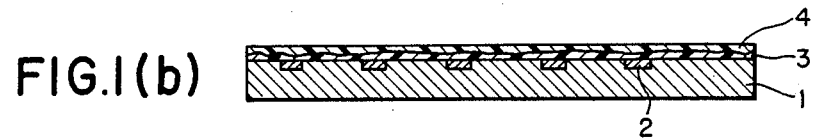

A light detection portion 2 is disposed on the silicon wafer 1 on which are disposed an image pickup element of a structure formed with the protection film 3 made of phosphorus glass, quartz, etc. and, further, a flattening layer 4 for the purpose of flattening (FIG. 1a and FIG. 1b).

Second Step

A layer 5 to be dyed comprising a water soluble photosensitive material which is a mixture of gelatine, casein, glue, polyvinylalcohol and bichromate is formed.

Third Step

Exposure is applied in a predetermined pattern.

Fourth Step

Development is applied.

Fifth Step

Dyeing is applied to the patterned layer to be dyed to form a dyed layer.

Sixth Step

A coating solution for forming the dyeing resistant insulation film is applied over the entire surface by a customary method and dried at a temperature from 150° C. to 200° C. to form a transparent dyeing resistant insulation film layer 7.

As the customary method for applying the coating solution, spinning, dipping spraying etc. may be used.

Seventh Step

Procedures of forming a patterned and dyed layer in the same manner as described above on the dyeing resistant insulation film layer and, further, forming thereover another dyeing resistant insulation layer are repeated by a required number of cycles, thereby forming a color filter matching with the image pickup element.

Further, for forming the flattening layer formed on the image pickup element with the aim of flattening, the process can be conducted efficiently by using the same material as that for the dyeing resistant insulation film according to the present invention.

One embodiment of the color filter using the dyeing resistant insulation film according to the present invention will be described more specifically referring to the drawings.

Figure 1C:
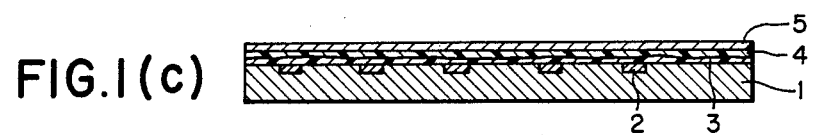
Figure 1D:
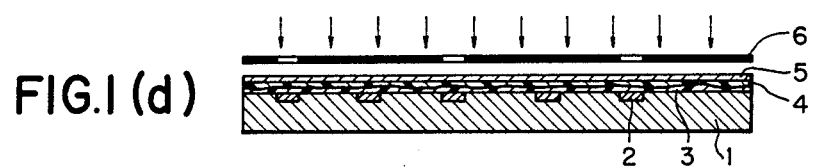
Figure 1E:
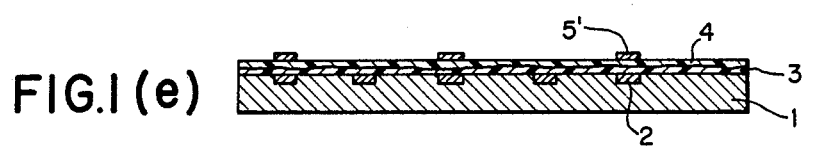
Figure 1F:
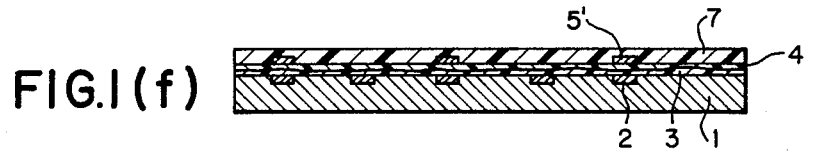

The color filter as the object of the present invention comprises a dyeing resistant insulation layer 7 and the patterned and dyed layer 5' (refer to FIG. 1f).

The image pickup element, for instance, has a structure in which a light detection portion 2 is disposed on the silicon wafer 1 and, further, a protection film 3 made of phosphor glass or quartz is disposed to the upper surface thereof (refer to FIG. 1a).

Then, the flattening layer 4 of from 0.2 to 2.0 μm thickness is formed on the protection film 3 of the image pickup element. As the flattening layer, the dyeing resistant insulation film according to the present invention is preferably used. The surface of the image pickup element is flattened by the layer (FIG. 1b).

Then, the water soluble photosensitive material layer described above is formed to a thickness from 0.1 μm to 2.0 μm on the flattening layer 4 (FIG. 1c).

Then, for forming the patterned and dyed layer 5', actinic rays are irradiated on the layer 5 to be dyed comprising the photosensitive material through the predetermined patterning mask 6 (FIG. 1d).

Then, areas not irradiated by the actinic rays are removed by developing the photosensitive material layer with water and the thus obtained pattern is dyed with a dye by a known method thereby forming the patterned and dyed layer 5' (FIG. 1e).

Then, a coating solution forming a dyeing resistant insulation film is coated over the entire surface and dried to form the dyeing resistant insulation layer 7 (FIG. 1f).

Figure 1G:
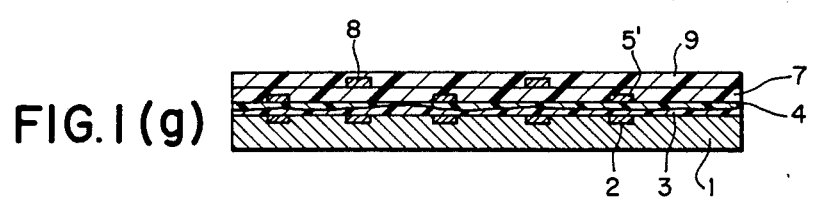

Then, a color filter shown in FIG. 1g can be prepared by repeating the procedures from FIG. 1c to FIG. 1f.

(EXAMPLE)

Synthesis Example 1

100 g of glycidyl methacrylate and 100 g methyl methacrylate were mixed, to which 0.5 g of N,N'-azobis isobutyronitrile was added and they were reacted in a nitrogen gas atmosphere under stirring at 60° C. for about 7 hours. After the reaction was over, the reaction product was poured into one liter of methanol to deposite a polymer and the resultant polymer was dried under a reduced pressure at the room temperature. The yield of the polymer was 150 g, the weight average molecular weight (MW) was 360,000 and the dispersity was 1.7.

EXAMPLE 1

A coating solution for forming a dyeing resistant insulation film was prepared by dissolving 10 g of the copolymer of glycidyl methacrylate and methyl methacrylate obtained in Synthesis Example 1 into 100 g of ethylene glycol monoethyl ether acetate and filtering them through a membrane filter thereby eliminating fine impurities.

The coating solution was applied on an image pickup element, comprising a light detection portion, a driving circuit for driving a phosphorus glass layer as the protection layer disposed on a silicon wafer, by a spinner to a layer thickness of 2.0 μm and dried at 170° C. for 30 min. thereby obtaining a flattening layer. Then, after coating CFR-100 as a casein type photosensitive aqueous solution (manufactured by Tokyo Ohka Kogyo Co., Ltd.) to a film thickness of 1 μm on the flattening layer and drying at 70° C. for 30 min, actinic rays were irradiated through a mask having a predetermined pattern and development was conducted with purified water at 30° C. for 30 sec. Then, the casein film was hardened by heating at 120° C. for 15 min, dipped into an aqueous solution (about 0.1 wt %) of Kayanol Yellow N5G (manufactured by Nippoin Kayaku Kabushiki Kaisha) adjusted to pH 4 with acetic acid at 65° C. for one minute, thereby dyeing the casein film.

Then, the coating solution was applied by a spinner to 1 μm film thickness and, after drying at 170° C. for 30 min, another patterned casein film was formed in the same manner as described above and dipped into an aqueous solution (about 0.3 wt % of Diacron Turquoise Blue GF (manufactured by Mitsubishi Chemical Industry Co., Ltd.) adjusted to pH 4 with acetic acid at 65° C. for one minute and only the casein film was dyed to form a dyed layer. Then, an image pickup element directly attached with a color filter was obtained by coating and drying the coating solution described above thereover to a film thickness of 0.5 μm.

When the image pickup element was observed from above vertically by an electron microscope, there was no deviation between the light detection portion and the patterned and dyed layer, no scattering was recognized and the color filter was accurately matched with the image pickup element.

Examples 2-9, Comparative 1-5

Image pickup elements each directly attached with a color filter were prepared in the same procedures as in Example 1 by using the copolymer synthesized by the same procedures as those in the Synthesis Example 1 except for changing the weight ratio between glycidyl methacrylate and methyl methacrylate. The deviation between the light detection portion and the dyed layer, as well as the defoliation of the dyed layer were observed. The results are shown in Table 1.

TABLE 1

| | Example | | | | | | | | Comparative Example | | | | |
|---|---|---|---|---|---|---|---|---|---|---|---|---|---|
| | 2 | 3 | 4 | 5 | 6 | 7 | 8 | 9 | 1 | 2 | 3 | 4 | 5 |
| Glycidyl methacrylate (weight ratio) | 8 | 2 | 6 | 4 | 8 | 2 | 6 | 4 | 0 | 1 | 9 | 1 | 1 |
| Methyl methacrylate (weight ratio) | 2 | 8 | 4 | 5 | 2 | 8 | 4 | 6 | 1 | 0 | 1 | 9 | 0 |
| Molecular weight | 360,000 | 280,000 | 400,000 | 230,000 | 180,000 | 100,000 | 105,000 | 70,000 | 230,000 | 260,000 | 270,000 | 215,000 | 650,000 |
| Dispersity | 1.72 | 1.63 | 1.78 | 1.61 | 1.83 | 1.88 | 2.10 | 2.84 | 1.79 | 1.49 | 1.60 | 1.65 | 2.24 |
| Deviation of casein pattern *1 | 0 | 0 | 0 | 0 | 0 | 0 | 0 | 0 | = | × | × | = | × |
| Defoliation of casein pattern *2 | 0 | 0 | 0 | 0 | 0 | 0 | 0 | 0 | × | 0 | 0 | × | 0 |

*1 0: with no deviation
=: deviation from 3 to 5 μm
×: deviation from 5 to 20 μm
*2 Defoliation of casein pattern from the dyeing resistant insulation layer upon development with water for obtaining casein pattern was observed.
0: with no defoliation
×: defoliation for the entire surface

What is claimed is

1. A color filter for use in a solid-state image pickup element, comprising a patterned, dyed layer and a dyeing-resistant insulation film formed over the patterned, dyed layer, said dyeing-resistant insulation film comprising a copolymer of glycidyl methacrylate and methyl methacrylate.

2. A color filter for use in a solid-state image pickup element as defined in claim 1, wherein the copolymer of glycidyl methacrylate and methyl methacrylate is prepared by copolymerizing glycidyl methacrylate and methyl methacrylate at a weight ratio of from 8:2 to 2:8.

3. A color filter for use in a solid-state image pickup element as defined in claim 1, wherein the copolymer of glycidyl methacrylate and methyl methacrylate is prepared by copolymerizing glycidyl methacrylate and methyl methacrylate at a weight ratio of from 3:7 to 5:5.

4. A color filter for use in a solid-state image pickup element as defined in claim 1, wherein the copolymer of glycidyl methacrylate and methyl methacrylate has a molecular weight of from 50,000 to 550,000.

5. A color filter for use in a solid-state image pickup element as defined in claim 1, wherein the copolymer of glycidyl methacrylate and methyl methacrylate has a molecular weight of from 150,000 to 400,000.

6. A color filter for use in a solid-state image pickup element as defined in claim 1, wherein the copolymer of glycidyl methacrylate and methyl methacrylate has a dispersity value of from 1.05 to 3.50.

7. A color filter for use in a solid-state image pickup element as defined in claim 1, further including a second dyeing-resistant insulation film on which the patterned, dyed layer is formed, said second dyeing-resistant insulation film comprising a copolymer of glycidyl methacrylate and methyl methacrylate.

8. A color filter for use in a solid-state image pickup element, comprising a first patterned, dyed layer of a first color; a first dyeing-resistant insulation film formed over the first patterned, dyed layer; a second patterned, dyed layer of a second color formed on the first dyeing-resistant insulation film; and a second dyeing-resistant insulation film formed over the second patterned, dyed layer; said dyeing-resistant insulation films comprising a copolymer of glycidyl methacrylate and methyl methacrylate.

9. A color filter as defined in claim 7, further including a third patterned, dyed layer of a third color formed on the second dyeing-resistant insulation film and a third dyeing-resistant insulation film formed over the third patterned, dyed layer, said third dyeing-resistant insulation film comprising a copolymer of glycidyl methacrylate and methyl methacrylate.

* * * * *